UNITED STATES PATENT OFFICE.

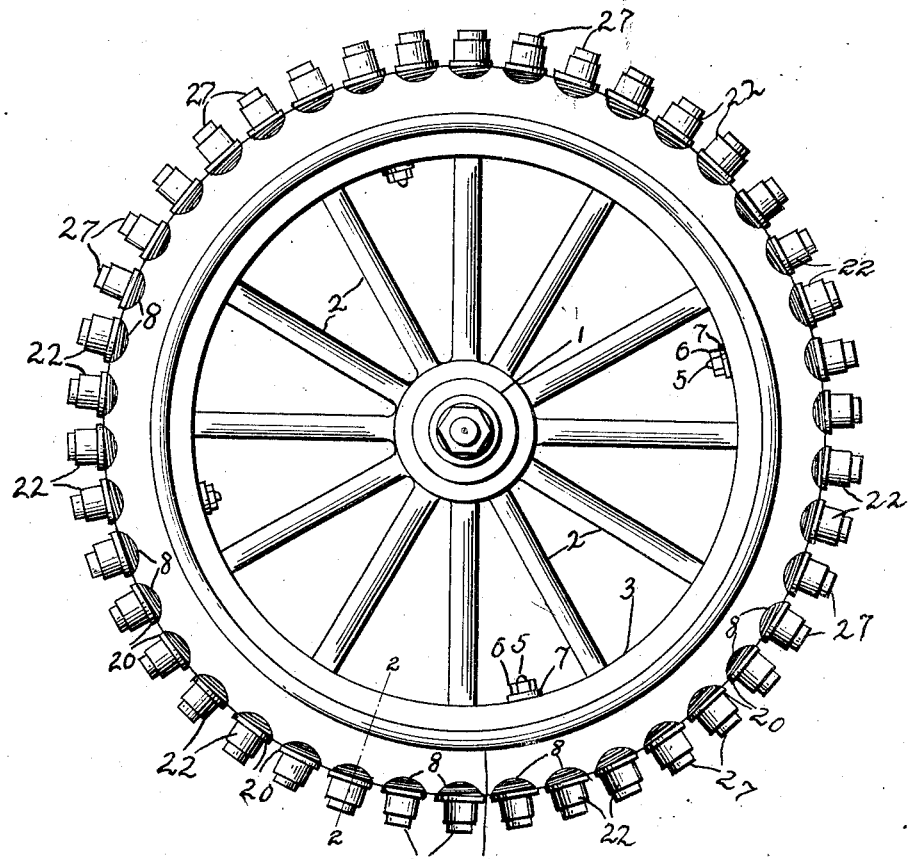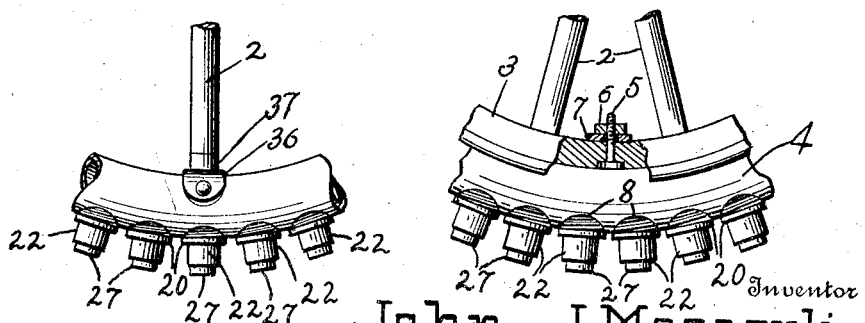

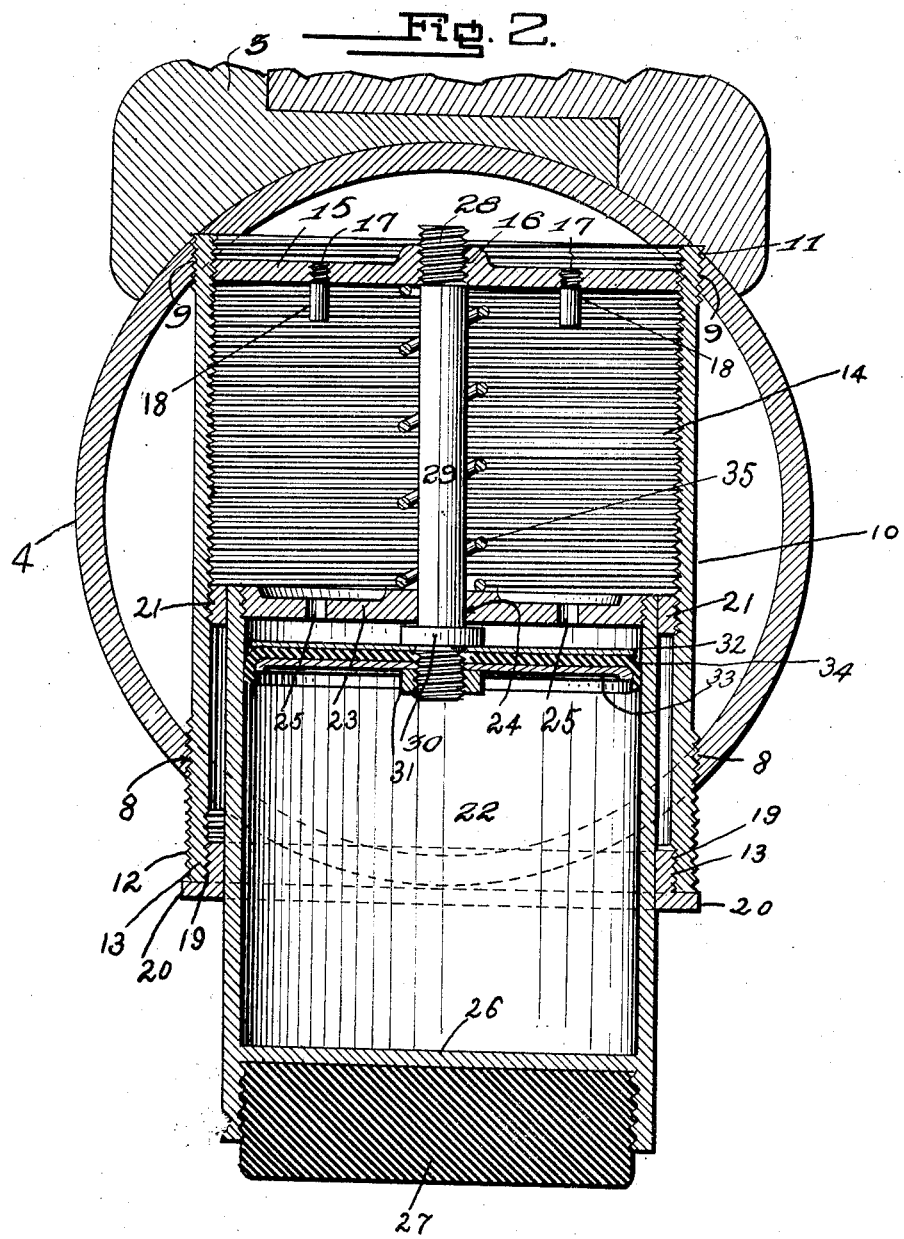

JOHN J. MESSERLI, OF KINGSVILLE, TEXAS.

AUTOMOBILE-WHEEL.

1,002,727.  Specification of Letters Patent.  Patented Sept. 5, 1911.

Application filed August 24, 1910. Serial No. 578,650.

*To all whom it may concern:*

Be it known that I, JOHN J. MESSERLI, a citizen of the United States, residing at Kingsville, in the county of Nueces and State of Texas, have invented certain new and useful Improvements in Automobile-Wheels, of which the following is a specification, reference being had therein to the accompanying drawing.

This invention relates to wheels for vehicles and the principal object of the same is to provide a wheel that can be readily attached to the usual felly and which is provided with means that will absorb all shocks and jars, have a firm engagement with the road to prevent skidding and which will automatically remove mud and the like therefrom.

In carrying out the objects of the invention generally stated above it will be understood, of course, that the essential features thereof are necessarily susceptible of changes in details and structural arrangements, one preferred and practical embodiment of which is shown in the accompanying drawings, wherein:—

Figure 1 is a view in side elevation of the improved wheel. Fig. 2 is an enlarged transverse sectional view taken on the line 2—2, Fig. 1. Fig. 3 is a fragmentary view partly in section and partly in elevation showing the manner of attaching the tire to the felly. Fig. 4 is a fragmentary view in elevation of a variation of the invention.

Referring to the accompanying drawings by numerals, it will be seen that the improved wheel comprises the usual hub 1, spokes 2 and felly 3. A tire rim 4 that is preferably formed of steel is detachably fastened to said felly 3 by the bolts 5 and nuts 6, bearing washers 7 being interposed between the nuts and the felly. The tire rim 4 is in the form of a circular tube the outer surface of which is provided with regularly spaced threaded openings 8 which aline with the similarly spaced threaded sockets 9. Cylinders 10 which have externally threaded inner ends 11 for detachable and adjustable engagement with the sockets 9, are also similarly threaded at the outer ends 12 for detachable and adjustable engagement with the threaded openings 8. Said cylinders project well beyond the outer surface of the tire rim, as shown in the drawings. The outer ends of the cylinders are provided with internal threads 13, and said cylinders are also provided with additional internal threads 14 which extend to the rear ends thereof.

The cylinders 10 have their rear ends closed by the threaded disks 15 which adjustably engage the threads 14. Said disks are provided with a central opening 16 that is threaded and similar but smaller surrounding openings 17. Openings 17 are engaged by the threaded ends of plugs 18 that project into the cylinders.

The internal outer end threads of cylinders 10 are engaged by the threaded guide collars 19 that are provided with outturned annular flat flanges 20 that overlap the outer ends of said cylinder. The internal threads 14 of the cylinders 10 are engaged by the threaded guide collars 21.

Plunger cylinders 22 are slidable in cylinders 10 and are guided therein by the collars 19 and 21. The inner ends of cylinders 22 are internally threaded for the reception of the threaded closure disks 23. Said disks 23 are provided with a central opening 24 that aline with the central openings of disks 15, and are also provided with surrounding openings 25 that aline with the plugs 18. The outer ends of plungers 22 are internally threaded and at the inner ends of said threaded portions, said plungers are sealed by the plates 26. This arrangement provides a threaded recess at the outer end of each plunger and an externally threaded resilient plug 27 is removably seated in each recess.

The threaded central openings of disks 15 have the threaded end 28 of the piston rods 29 engage therewith. Said rods project through the central openings 24 of the plunger disks 23 and have pistons locked to the annular flanges 30 thereon by the nuts 31. Said pistons are preferably formed of the plates 32 and 33 and the interposed flexible disk 34 the outer edge of which projects beyond the similar edges of the plates 32 and 33. Springs 35 are coiled about piston rods 29, said springs being interposed between disks 15 and 23 and oppose the inward movements of the plungers 22.

In the form of the invention shown in Fig. 4, the tire rim 4 has plates 36 riveted or otherwise fastened thereto and each plate is provided with a socket 37 for the spokes 2. In this form of the invention the felly 3 is omitted. In all other respects the structure is the same as that described in connection with Figs. 1, 2, and 3 of the drawings.

From the foregoing description it will be seen that the plungers 22 will slide in the cylinders 10 when in contact with the roadway against the tension of springs 17 and the pressure of the air in said cylinders. When the plungers leave the roadway, the springs 17 and the air pressure in cylinders 10 will force the plungers 22 outward to their original positions.

The plugs carried by the plungers are preferably of rubber and will obviously firmly engage with the roadway to prevent skidding and it will also be clear that mud or other material that will adhere to the plungers will be forced therefrom by the movements of the plungers.

What I claim as my invention is:—

1. A wheel comprising a rim outwardly projecting cylinders detachably connected thereto, adjustable bottoms for said cylinders, guide collars adjustably connected to said cylinders, plungers slidable in said cylinders and guided by said collars, adjustable bases for said plungers, said bases provided with a central opening, piston rods detachably connected to the bottoms of said cylinders and projecting through the openings in the bases of said plungers, pistons carried by the projected portions of said rods, springs carried by said rods and interposed between the bottoms of the cylinders and the bases of the plungers, and road-gripping means carried by said plungers.

2. A wheel comprising a rim provided with sockets, cylinders in said sockets and projecting beyond the same, cylindrical plungers slidable in said cylinders and each provided with a base opening, means in said cylinders for guiding said plungers piston rods adjustably mounted in said cylinders and projecting through the base openings of the plungers, pistons on said rods within said plungers, plates sealing the outer ends of said plungers, and road gripping means in the outer ends of said plungers.

3. A wheel comprising a rim, cylinders projecting outwardly therefrom, said cylinders being internally threaded, threaded disks sealing the inner ends of said cylinders and adjustably engaging the threads thereof, hollow plungers slidable in said cylinders, piston rods carried by said disks and projecting into said plungers, pistons carried by said rods within said plungers, and road gripping means carried by said plungers.

4. A wheel comprising a rim provided with sockets, cylinders in said sockets, adjustable plates closing the inner ends of said cylinders, hollow plungers slidable in said cylinders, road engaging means carried by the outer ends of said plungers, piston rods carried by said plates and projecting into said plungers, and pistons carried by said rods and arranged in said plungers.

In testimony whereof I hereunto affix my signature in presence of two witnesses.

JOHN J. MESSERLI.

Witnesses:
D. McN. TURNER,
H. H. SEGREST.